(12) United States Patent
Ikemoto

(10) Patent No.: US 11,296,583 B2
(45) Date of Patent: Apr. 5, 2022

(54) CORE MANUFACTURING METHOD AND CORE

(71) Applicant: AISIN CORPORATION, Kariya (JP)

(72) Inventor: Masayuki Ikemoto, Anjo (JP)

(73) Assignee: AISIN CORPORATION, Kariya (JP)

( * ) Notice: Subject to any disclaimer, the term of this patent is extended or adjusted under 35 U.S.C. 154(b) by 447 days.

(21) Appl. No.: 16/490,255

(22) PCT Filed: Feb. 13, 2018

(86) PCT No.: PCT/JP2018/004842
§ 371 (c)(1),
(2) Date: Aug. 30, 2019

(87) PCT Pub. No.: WO2018/179923
PCT Pub. Date: Oct. 4, 2018

(65) Prior Publication Data
US 2020/0007012 A1 Jan. 2, 2020

(30) Foreign Application Priority Data

Mar. 31, 2017 (JP) .............................. JP2017-071591

(51) Int. Cl.
*H02K 15/02* (2006.01)
*B23K 26/21* (2014.01)
*B23K 15/00* (2006.01)
*H02K 1/17* (2006.01)
*H02K 1/276* (2022.01)

(52) U.S. Cl.
CPC ......... *H02K 15/02* (2013.01); *B23K 15/0046* (2013.01); *B23K 26/21* (2015.10); *H02K 1/17* (2013.01); *H02K 1/2766* (2013.01)

(58) Field of Classification Search
CPC ........ H02K 15/02; H02K 1/17; H02K 1/2766; B23K 26/21; B23K 15/0046
USPC ....................................................... 310/156.08
See application file for complete search history.

(56) References Cited

U.S. PATENT DOCUMENTS

2001/0015589 A1  8/2001  Sakagami et al.
2011/0248596 A1  10/2011  Utaka et al.
2012/0206007 A1  8/2012  Kitagawa et al.

FOREIGN PATENT DOCUMENTS

| JP | S54-124845 A | 9/1979 |
| JP | 2011-234606 A | 11/2011 |
| JP | 2013-215755 A | 10/2013 |
| JP | 2015-174132 A | 10/2015 |
| JP | 2016-103882 A | 6/2016 |

(Continued)

OTHER PUBLICATIONS

May 1, 2018 International Search Report issued in International Patent Application No. PCT/JP2018/004842.

*Primary Examiner* — Terrance L Kenerly
(74) *Attorney, Agent, or Firm* — Oliff PLC

(57) ABSTRACT

A core manufacturing that includes stacking a plurality of electromagnetic steel plates in an axial direction; performing first welding on an inner surface of a through hole formed in a stack of the electromagnetic steel plates and continuous in the axial direction, the first welding being performed toward a first side in the axial direction which is one side in the axial direction; and performing second welding on the inner surface of the through hole, the second welding being performed toward a second side in the axial direction which is the other side in the axial direction.

17 Claims, 8 Drawing Sheets

(56) References Cited

FOREIGN PATENT DOCUMENTS

WO 99/021264 A1 4/1999
WO 2011/158316 A1 12/2011

CORE MANUFACTURING METHOD AND CORE

BACKGROUND

The present disclosure relates to core manufacturing methods for manufacturing a core for a rotating electrical machine and cores for rotating electrical machines.

Rotating electrical machines have a stator and a rotor, and a stator core and a rotor core are sometimes formed by a plurality of electromagnetic steel plates stacked together in the axial direction. Japanese Patent Application Publication No. 2011-234606 (JP 2011-234606 A) discloses that, when manufacturing a rotor core having such a configuration, a plurality of electromagnetic steel plates are stacked together and outer or inner peripheral surfaces of the stacked electromagnetic steel plates are welded to join the plurality of electromagnetic steel plates together.

However, for example, in the case where an inner surface of a through hole formed in the stack of the electromagnetic steel plates is welded by using a process such as laser welding, electron beam welding, etc., the emission angle of laser or electron beams is limited depending on the axial length of the stack and the size of the through hole, which may reduce productivity.

SUMMARY

An exemplary aspect of the disclosure improves productivity in manufacturing a core for a rotating electrical machine by stacking a plurality of electromagnetic steel plates and joining the stacked electromagnetic steel plates together by welding.

A core manufacturing method according to the present disclosure is a core manufacturing method for manufacturing a core for a rotating electrical machine having a stator and a rotor by using a welding device, including: stacking a plurality of electromagnetic steel plates in an axial direction; performing first welding on an inner surface of a through hole formed in a stack of the electromagnetic steel plates and continuous in the axial direction, the first welding being performed toward a first side in the axial direction which is one side in the axial direction; and performing second welding on the inner surface of the through hole, the second welding being performed toward a second side in the axial direction which is the other side in the axial direction, wherein a first welding region and a second welding region overlap each other in the axial direction, the first welding region being a region in the axial direction which is welded in the first welding, and the second welding region being a region in the axial direction which is welded in the second welding.

With this configuration, since the inner surface of the through hole of the stack of the electromagnetic steel plates is welded from both sides in the axial direction, productivity can be improved. In this case, since the first welding region that is welded in the first welding and the second welding region that is welded in the second welding region overlap each other in the axial direction, a sufficient fixing force can be obtained.

Another core manufacturing method according to the present disclosure is a core manufacturing method for manufacturing a core for a rotating electrical machine having a stator and a rotor by using a welding device, including: stacking a plurality of electromagnetic steel plates in an axial direction; performing first welding on a stack of the electromagnetic steel plates, the first welding being performed toward a first side in the axial direction which is one side in the axial direction; and performing second welding on the stack, the second welding being performed toward a second side in the axial direction which is the other side in the axial direction, wherein each of the first welding and the second welding includes an output increase period during which welding is performed while gradually increasing output energy of the welding device, and a first increase region and a second increase region overlap each other in the axial direction, the first increase region being a region in the axial direction which is welded during the output increase period of the first welding, the second increase region being a region in the axial direction which is welded during the output increase period of the second welding.

With this configuration, in each of the two steps in which welding is performed by scanning in the opposite directions in the axial direction (the first welding and the second welding), the output energy of the welding device is gradually increased during the output increase period. Formation of spatter and blow holes can therefore be restrained. Accordingly, welding quality can be stabilized.

In each of the first increase region for the first welding and the second increase region for the second welding, the output energy of the welding device is relatively low and the sectional area of a melted portion resulting from welding is therefore relatively small. Even in such a case, since the first increase region and the second increase region overlap each other in the axial direction, the sectional areas of the melted portions in these increase regions can compensate each other and a sufficient overall fixing force can be obtained.

Accordingly, when manufacturing the core for the rotating electrical machine by stacking the plurality of electromagnetic steel plates and joining the stacked electromagnetic steel plates together by welding, a sufficient fixing force can be obtained while stabilizing welding quality.

A core according to the present disclosure is a core for a rotating electrical machine, wherein the core includes a stack formed by stacking a plurality of electromagnetic steel plates in an axial direction, the stack has a through hole that is continuous in the axial direction, a first melted portion and a second melted portion are formed in an inner surface of the through hole, the first melted portion extending through a plurality of the electromagnetic steel plates in the axial direction from an end on a first side in the axial direction which is one side in the axial direction, and the second melted portion extending through a plurality of the electromagnetic steel plates in the axial direction from an end on a second side in the axial direction which is the other side in the axial direction, and the first melted portion and the second melted portion are located at different positions in a circumferential direction and overlap each other in the axial direction.

With this configuration, the first welding portion and the second welding portion are formed in the inner surface of the through hole of the stack of the electromagnetic steel plates so as to extend from both sides in the axial direction. The core can therefore be produced with high productivity. Since the first welding portion and the second welding portion are located at different positions in the circumferential direction and overlap each other in the axial direction, a sufficient fixing force can be obtained.

Further features and advantages of the technique according to the present disclosure will become more apparent from the following description of illustrative, non-restrictive embodiments which is given with reference to the accompanying drawings.

DETAILED DESCRIPTION OF EMBODIMENTS

First Embodiment

A first embodiment of a core and a core manufacturing method will be described with reference to the accompanying drawings. The core is a core for a rotating electrical machine 1, and the core manufacturing method is a method for manufacturing the core for the rotating electrical machine 1. The core can be used as a core for the rotating electrical machine 1 that is used as a driving force source for wheels in, e.g., hybrid vehicles, electric vehicles, etc., and the core manufacturing method can be used to manufacture a core for the rotating electrical machine 1 that serves as such a driving force source.

Figure 1:
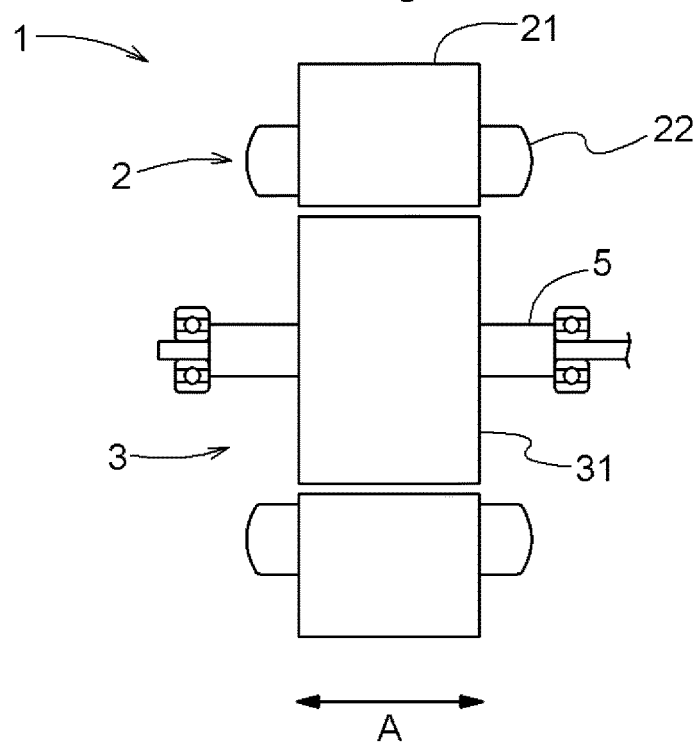
FIG. 1 is a schematic view of a rotating electrical machine of an embodiment.

As shown in FIG. 1, the rotating electrical machine 1 includes a stator 2 and a rotor 3. The stator 2 is fixed to a non-rotary member (not shown) such as a case. The stator 2 has a stator core 21 and a coil 22. The stator core 21 can be formed by, e.g., compacted magnetic powder or a plurality of electromagnetic steel plates stacked in an axial direction A. The coil 22 is wound in the stator core 21.

The rotor 3 is disposed adjacent to the stator 2 in a radial direction. The rotor 3 of the present embodiment is configured as an inner rotor disposed radially inside the stator 2. The rotor 3 is coupled at its radial center to a rotor shaft 5 and is rotatably supported on its both sides in the axial direction A via the rotor shaft 5 and bearings.

Figure 2:
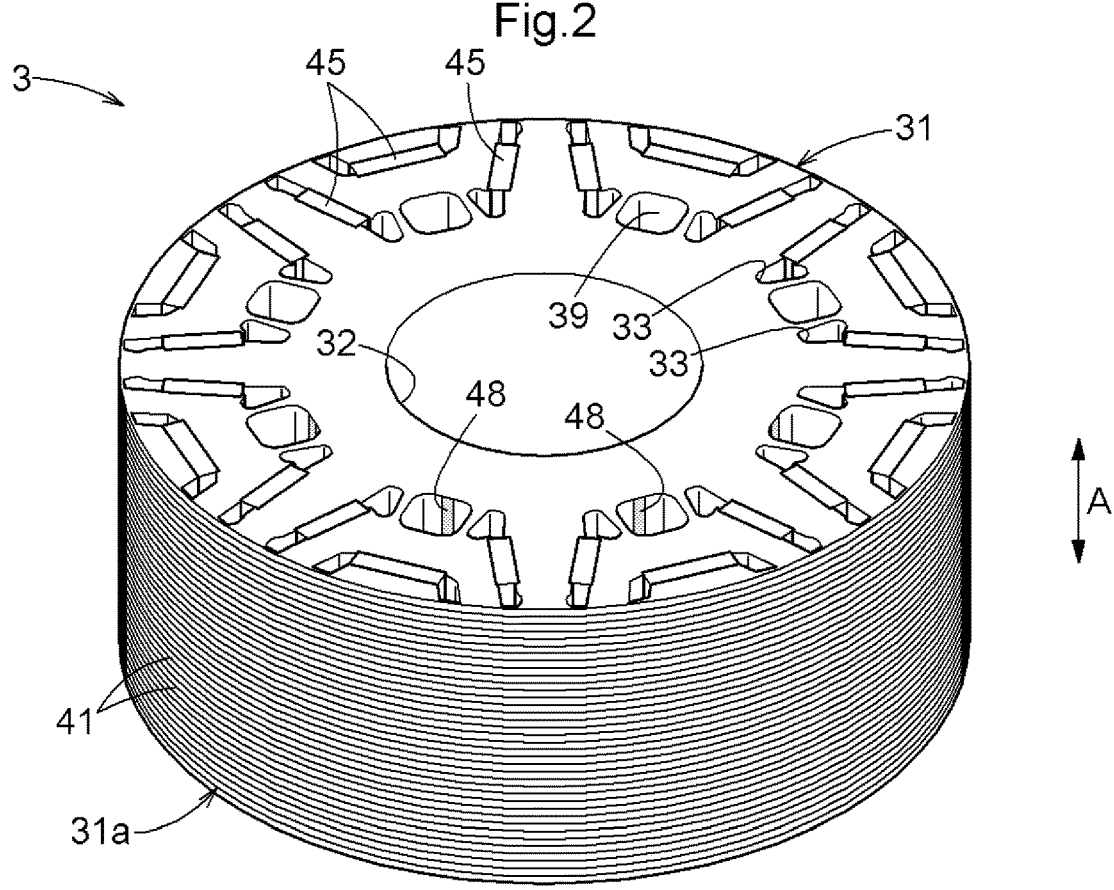
FIG. 2 is a perspective view of a rotor.

As shown in FIG. 2, the rotor 3 includes a rotor core 31 and permanent magnets 45 embedded in the rotor core 31. That is, the rotor 3 of the present embodiment is configured as an interior permanent magnet rotor. The rotor core 31 is formed by a plurality of electromagnetic steel plates 41 stacked in the axial direction A. The electromagnetic steel plates 41 are in the shape of an annular plate. The plurality of electromagnetic steel plates 41 that form the rotor core 31 are stacked in the axial direction A and joined together by welding (in the present embodiment, laser welding).

The rotor core 31 formed by the plurality of electromagnetic steel plates 41 joined together have a central hole 32 on its radially inner side. The rotor shaft 5 is inserted through and fixed in the central hole 32. An outer peripheral surface of the rotor core 31 is a stator facing surface 31a that faces the stator.

Figure 3:
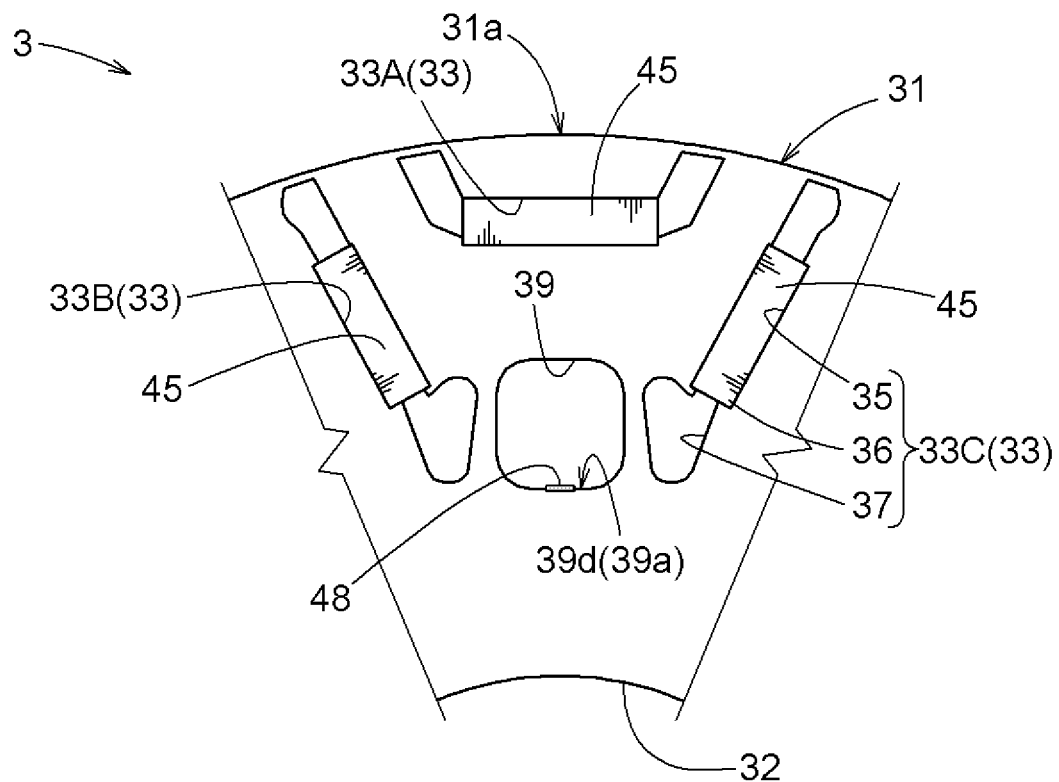
FIG. 3 is an enlarged plan view of the rotor.

The rotor core 31 has a plurality of magnet insertion holes 33 and a plurality of magnetic barrier holes 39. These holes are formed so as to be distributed in a circumferential direction. The magnet insertion holes 33 and the magnetic barrier holes 39 extend through in the axial direction A. The magnet insertion holes 33 are holes in which the permanent magnets 45 are inserted. In the present embodiment, as shown in FIG. 3, three magnet insertion holes 33 are formed per magnetic pole. A first magnet insertion hole 33A is formed in a radially outer part of the rotor core 31 so as to extend approximately in the circumferential direction. A second magnet insertion hole 33B and a third magnet insertion hole 33C are arranged on both sides of the first magnet insertion hole 33A in the circumferential direction so as to extend approximately along the radial direction.

Each magnet insertion hole 33 has a magnet placement portion 35 in which the permanent magnet 45 is placed and a pair of magnetic barrier portions 37 formed on both sides in a longitudinal direction of the magnet placement portion 35. The magnetic barrier portions 37 serve as magnetic resistance (flux barriers) to the magnetic flux flowing in the rotor core 31. Stopping portions 36 that stop the end faces on both sides in the longitudinal direction of the permanent magnet 45 are formed in the boundary portions between the magnet placement portion 35 and the magnetic barrier portions 37. The permanent magnet 45 is positioned in the magnet placement portion 35 by the stopping portions 36. In this state, the permanent magnets 45 are embedded in the rotor core 31 so as to extend through the rotor core 31 in the axial direction A.

The magnetic barrier hole 39 is formed between the radially inner ends (the radially inner magnetic barrier portions 37) of the second magnet insertion hole 33B and the third magnet insertion hole 33C in the circumferential direction. Like the magnetic barrier portions 37 of the magnet insertion holes 33, the magnetic barrier hole 39 serves as magnetic resistance (flux barrier) to the magnetic flux flowing in the rotor core 31 (the rotor core 31). The magnetic barrier hole 39 restricts the flow of the magnetic flux in the rotor core 31.

The core manufacturing method of the present embodiment (in this example, a method for manufacturing the rotor core 31; in this case, the rotor core 31 corresponds to the "core") includes a stacking step, a first welding step, and a second welding step. The stacking step is first performed, and the first welding step and the second welding step are then performed.

Figure 4:
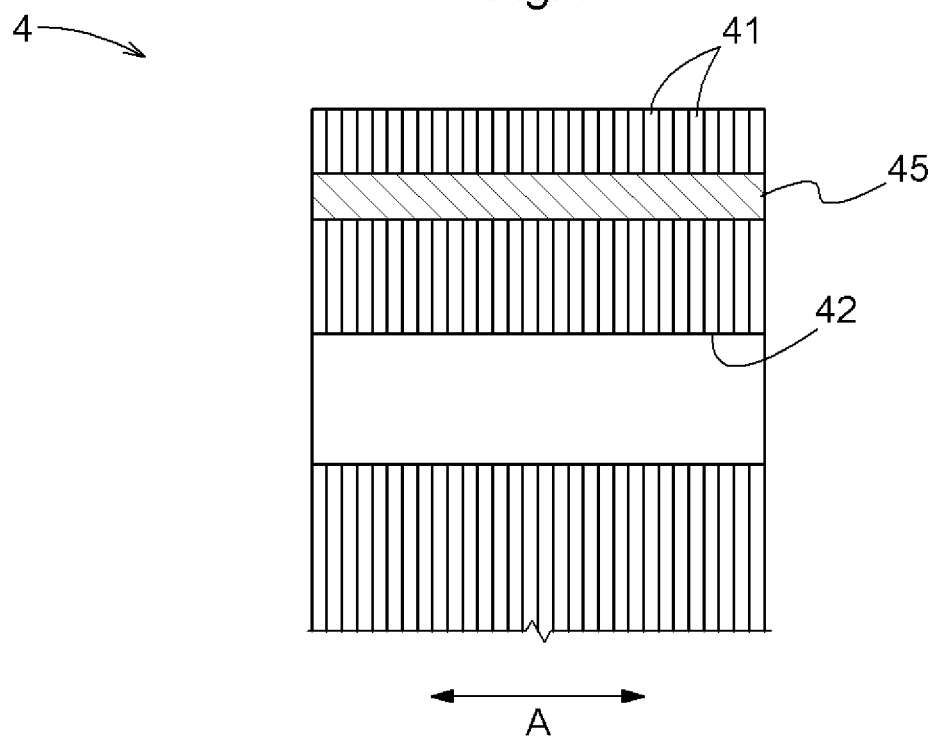
FIG. 4 is a schematic view of a stacking step.

In the stacking step, as shown in FIG. 4, a plurality of electromagnetic steel plates 41 are used, and the plurality of electromagnetic steel plates 41 are stacked in the axial direction A. In the present embodiment, each of the electromagnetic steel plates 41 has holes 42, and in the stacking step, the plurality of electromagnetic steel plates 41 are stacked such that the holes 42 are connected in the axial direction A to form through holes (holes that will eventually serve as magnetic barrier holes 39). At this time, magnet insertion holes 33 are also similarly formed as through holes extending in the axial direction A. A stack 4 of the plurality of electromagnetic steel plates 41 is formed by this stacking step.

Figure 5:
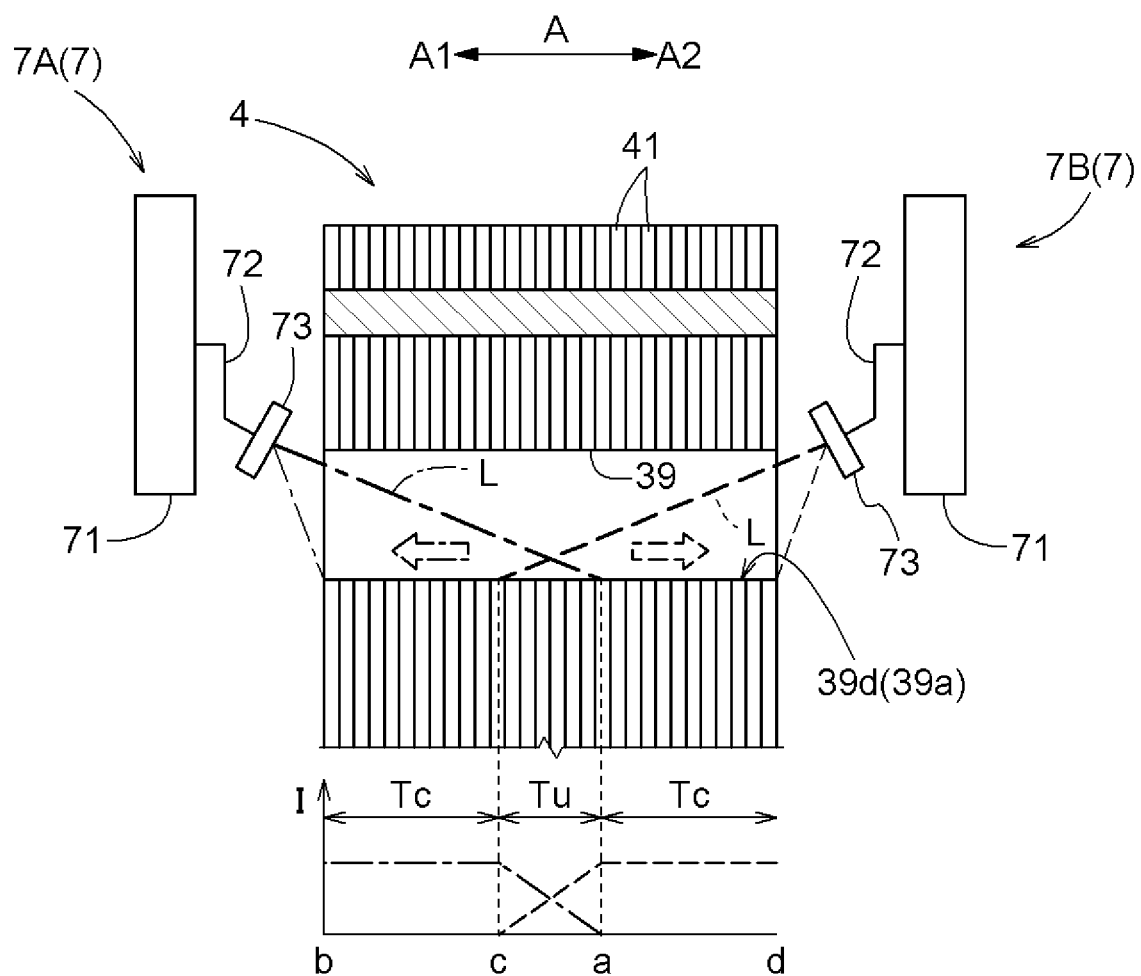
FIG. 5 is a schematic view illustrating a first welding step and a second welding step of a first embodiment.

As shown in FIG. 5, the first welding step and the second welding step are performed by using a welding device 7. In the present embodiment, two devices, namely a first welding device 7A and a second welding device 7B, are used as the welding device 7. The first welding device 7A and the second welding device 7B are disposed at a predetermined interval in the axial direction A, and the stack 4 is placed therebetween. The first welding device 7A is thus disposed on one side in the axial direction A, namely on a first side A1 in the axial direction, with respect to the stack 4, and the second welding device 7B is disposed on the other side in the axial direction A, namely on a second side A2 in the axial direction, with respect to the stack 4. The first welding step and the second welding step are performed in this state.

The welding device 7 (the first welding device 7A and the second welding device 7B) is configured as a laser welding device having a mechanism for emitting laser light L. Each of the first welding device 7A and the second welding device 7B includes a laser oscillator 71, an optical path 72, and a condenser lens 73. The laser oscillator 71 oscillates laser light L such as $CO_2$ laser or YAG laser. The laser light L from the laser oscillator 71 follows the optical path 72 formed by a fixed optical system, an optical fiber, etc. and is collected by the condenser lens 73 onto a workpiece (work), namely the stack 4 of the electromagnetic steel plates 41 (specifically, an inner surface 39a of the magnetic barrier hole 39). In the present embodiment, the welding device 7 (the first welding device 7A and the second welding device 7B) is configured so as to move the emitted laser light L (move the focal point of the laser light L).

In the present embodiment, the first welding step is performed by using the first welding device 7A disposed on the first side A1 in the axial direction with respect to the stack 4, and the second welding step is performed by using the second welding device 7B disposed on the second side A2 in the axial direction with respect to the stack 4. The operation period of the first welding device 7A and the operation period of the second welding device 7B are made to overlap each other so that the duration of the first welding step and the duration of the second welding step overlap each other. That is, the first welding device 7A and the second welding device 7B are simultaneously operated so that the first welding step and the second welding step are simultaneously performed.

In the first welding step, the first welding device 7A is used to perform first welding on the stack 4 of the electromagnetic steel plates 41 toward the first side A1 in the axial direction. In the present embodiment, the laser light L is emitted to the through hole (the magnetic barrier hole 39) formed in the stack 4 to scan the through hole, thereby laser-welding the inner surface 39a of the magnetic barrier hole 39 (more specifically, a distal inner surface 39d that is an inner surface located farther away from the stator facing surface 31a (see FIG. 3)). At this time, the first welding device 7A disposed on the first side A1 in the axial direction with respect to the stack 4 moves the laser light L from a predetermined position located on the second side A2 in the axial direction with respect to the middle position of the stack 4 in the axial direction A (a welding start position a) toward an end on the first side A1 in the axial direction (an end position b) to perform laser welding. In the present embodiment, the magnetic barrier hole 39 corresponds to the "through hole."

As shown in FIG. 5, the first welding step includes an output increase period Tu and a constant output period Tc. The output increase period Tu is a period during which welding is performed while gradually increasing the output energy of the first welding device 7A. In FIG. 5, the output energy of the first welding device 7A is gradually increased at a constant rate while the laser light L is moved from the welding start position a to a predetermined position between the welding start position a and the end position b on the first side A1 in the axial direction (an intermediate position c). It is herein assumed that the laser light L is moved at a constant speed in the axial direction A. The period during which the laser light L is moved from the welding start position a toward the first side A1 in the axial direction to the intermediate position c is the output increase period Tu of the first welding step. By thus gradually increasing the output energy of the first welding device 7A during such an output increase period Tu, formation of spatter and blow holes can be restrained and welding quality can be stabilized.

The constant output period Tc is a period during which welding is performed while keeping the output energy of the first welding device 7A within a certain range. In FIG. 5, the output energy of the first welding device 7A is kept at a fixed value while the laser light L is moved from the intermediate position c, which is also an end position of the output increase period Tu, to the end position b on the first side A1 in the axial direction. The period during which the laser light L is moved from the intermediate position c toward the first side A1 in the axial direction to the end position b is the constant output period Tc of the first welding step.

In the second welding step, the second welding device 7B is used to perform second welding on the stack 4 of the electromagnetic steel plates 41 toward the second side A2 in the axial direction. In the second welding step as well, the laser light L is emitted to the through hole (the magnetic barrier hole 39) formed in the stack 4 to scan the through hole, thereby laser-welding the inner surface 39a of the magnetic barrier hole 39 (more specifically, the distal inner surface 39d that is an inner surface located farther away from the stator facing surface 31a (see FIG. 3)). At this time, the second welding device 7B disposed on the second side A2 in the axial direction with respect to the stack 4 moves the laser light L from a predetermined position located on the first side A1 in the axial direction with respect to the middle position of the stack 4 in the axial direction A (a welding start position) toward an end on the second side A2 in the axial direction (an end position d) to perform laser welding. In the present embodiment, the welding start position for the second welding step matches the intermediate position c for the first welding step. The welding start position for the second welding step is therefore hereinafter referred to as the "welding start position c."

As shown in FIG. 5, the second welding step also includes an output increase period Tu and a constant output period Tc. The output increase period Tu is a period during which welding is performed while gradually increasing the output energy of the second welding device 7B. In FIG. 5, the output energy of the second welding device 7B is gradually increased at a constant rate while the laser light L is moved from the welding start position c to a predetermined position between the welding start position c and the end position d on the second side A2 in the axial direction (an intermediate position). It is herein assumed that the laser light L is moved at a constant speed in the axial direction A. In the present embodiment, the intermediate position for the second welding step matches the welding start position a for the first welding step. The intermediate position for the second welding step is therefore hereinafter referred to as the "intermediate position a." The period during which the laser light L is moved from the welding start position c toward the second side A2 in the axial direction to the intermediate position a is the output increase period Tu of the second welding step. By thus gradually increasing the output energy of the second welding device 7B during such an output increase period Tu, formation of spatter and blow holes can be restrained and welding quality can be stabilized.

The constant output period Tc is a period during which welding is performed while keeping the output energy of the second welding device 7B within a certain range. In FIG. 5, the output energy of the second welding device 7B is kept at a fixed value while the laser light L is moved from the intermediate position a, which is also an end position of the output increase period Tu, to the end position d on the second side A2 in the axial direction. The period during which the laser light L is moved from the intermediate position a toward the second side A2 in the axial direction to the end position d is the constant output period Tc of the second welding step.

Figure 6:
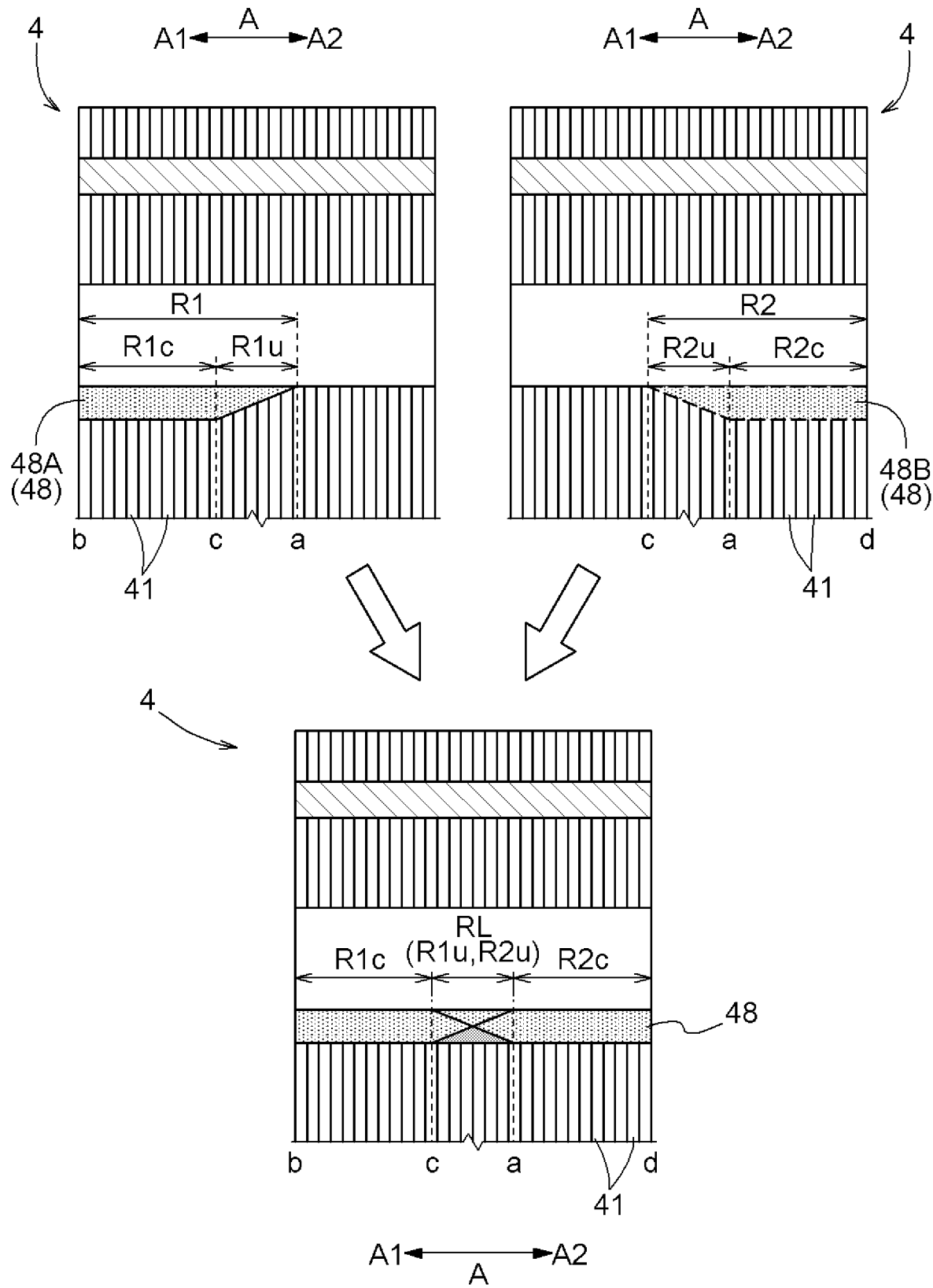
FIG. 6 shows conceptual views of sections of a rotor core that is produced.

FIG. 6 conceptually shows sections of the rotor core 31 after completion of the first welding step and the second welding step. A conceptual view on the upper left side in FIG. 6 shows only a first melted portion 48A formed by the first welding step. A conceptual view on the upper right side in FIG. 6 shows only a second melted portion 48B formed by the second welding step. A conceptual view on the lower side in FIG. 6 shows an entire melted portion 48, namely a combined melted portion of the first melted portion 48A and the second melted portion 48B.

As shown on the upper left side in FIG. 6, the first melted portion 48A is formed by a first welding region R1, namely a region in the axial direction A which is welded in the first welding step. The first melted portion 48A (the first welding region R1) includes a first increase region R1u, namely a region in the axial direction A which is welded during the output increase period Tu of the first welding step, and a first constant output region R1c, namely a region in the axial direction A which is welded during the constant output period Tc of the first welding step. The first increase region R1u is formed between the position a and the position c in the axial direction A as a region having such a right triangular sectional shape that the depth gradually increases as it gets farther away from the position a and closer to the position c. The first constant output region R1c is formed between the position c and the position b in the axial direction A as a region having a rectangular sectional shape with a constant depth.

As shown on the upper right side in FIG. 6, the second melted portion 48B is formed by a second welding region R2, namely a region in the axial direction A which is welded in the second welding step. The second melted portion 48B (the second welding region R2) includes a second increase region R2u, namely a region in the axial direction A which is welded during the output increase period Tu of the second welding step, and a second constant output region R2c, namely a region in the axial direction A which is welded during the constant output period Tc of the second welding step. The second increase region R2u is formed between the position c and the position a in the axial direction A as a region having such a right triangular sectional shape that the depth gradually increases as it gets farther away from the position c and closer to the position a. The second constant output region R2c is formed between the position a and the position d in the axial direction A as a region having a rectangular sectional shape with a constant depth.

As can be well understood from the view shown on the lower side in FIG. 6, the first welding region R1, namely a region in the axial direction A which is welded in the first welding step, and the second welding region R2, namely a region in the axial direction A which is welded in the second welding step, overlap each other in the axial direction A. More specifically, the first increase region R1u, namely a region in the axial direction A which is welded during the output increase period Tu of the first welding step, and the second increase region R2u, namely a region in the axial direction A which is welded during the output increase period Tu of the second welding step, overlap each other in the axial direction A. A region where the first increase region R1u and the second increase region R2u overlap each other in the axial direction A is hereinafter referred to as an "overlapping region RL." The position of the overlapping region RL is set so that the overlapping region RL includes the middle position of the stack 4 in the axial direction A.

In the present embodiment, as described above, the position a is the welding start position for the first welding step and the end position of the output increase period Tu of the second welding step, and the position c is the welding start position for the second welding step and the end position of the output increase period Tu of the first welding step. The first increase region R1u and the second increase region R2u are thus set so as to be located at the same position in the axial direction A and to have the same length in the axial direction A. In other words, in the present embodiment, the first increase region R1u and the second increase region R2u completely overlap each other in the axial direction A.

Moreover, the first constant output region R1c, namely a region in the axial direction A which is welded during the constant output period Tc of the first welding step, does not overlap the second increase region R2u, and the second constant output region R2c, namely a region in the axial direction A which is welded during the constant output period Tc of the second welding step, does not overlap the first increase region R1u.

Furthermore, in the present embodiment, the first welding region R1 (the first melted portion 48A) and the second welding region R2 (the second melted portion 48B) are formed at the same position in the through hole (the magnetic barrier hole 39) in the circumferential direction. The first welding region R1 and the second welding region R2 thus overlap each other in the axial direction A at the same position in the circumferential direction. The end on the second side A2 in the axial direction of the first melted portion 48A and the end on the first side A1 in the axial direction of the second melted portion 48B are fused so that the first melted portion 48A and the second melted portion 48B together form a straight melted portion 48.

In the present embodiment, the first welding region R1 and the second welding region R2 are separately provided on both sides in the axial direction A, whereby productivity can be improved. Moreover, since the positional relationship among the first increase region R1u, the first constant output region R1c, the second increase region R2u, and the second constant output region R2c is set as described above, the depth (sectional area) of the melted portion 48 can be made constant along its entire length in the axial direction A. Especially, even if the first increase region R1u or the second increase region R2u has a region where the melted portion 48A, 48B is shallow due to relatively low output energy of the welding device 7A, 7B, the depth of the melted portion 48 can be made constant in the overlapping region RL as well, as the first increase region R1u and the second increase region R2u completely overlap each other. The fixing forces in the increase regions R1u, R2u thus compensate each other, whereby a sufficient overall fixing force can be obtained. Since the depth of the melted portion 48 can be made constant along the entire length of the melted portion 48 in the axial direction A including the constant output regions R1c, R2c, magnetic characteristics of the rotor core 31 that is produced can be easily made uniform in the axial direction A.

The amount by which the first increase region R1u and the second increase region R2u overlap each other in the axial direction A is set so that the sectional area of the radial section of the melted portion 48 in the overlapping region RL is equal to or larger than a predetermined reference area. For example, the reference area is set based on the magnitude of torsional stress, centrifugal force, and stress associated with thermal expansion and thermal contraction, which can be applied to the rotor core 31. That is, the reference area is set to a value large enough to maintain the joined state of the plurality of electromagnetic steel plates 41 forming the rotor core 31 even if the torsional stress, the centrifugal force, and the stress associated with thermal expansion and thermal compression, which can be expected under normal use, are applied to the rotor core 31. The rotor core 31 having sufficient strength can thus be manufactured by a method using laser welding while reducing the manufacturing time.

Second Embodiment

A second embodiment of the core and the core manufacturing method will be described with reference to the drawings. The present embodiment is partially different from the first embodiment in the specific manner in which the first welding step and the second welding step of the core manufacturing method are performed. The core manufacturing method of the present embodiment will be described below mainly with respect to the differences from the first embodiment. The present embodiment is similar to the first embodiment unless otherwise specified, and the elements similar to the first embodiment are denoted with the same reference characters and detailed description thereof will be omitted.

Figure 7:
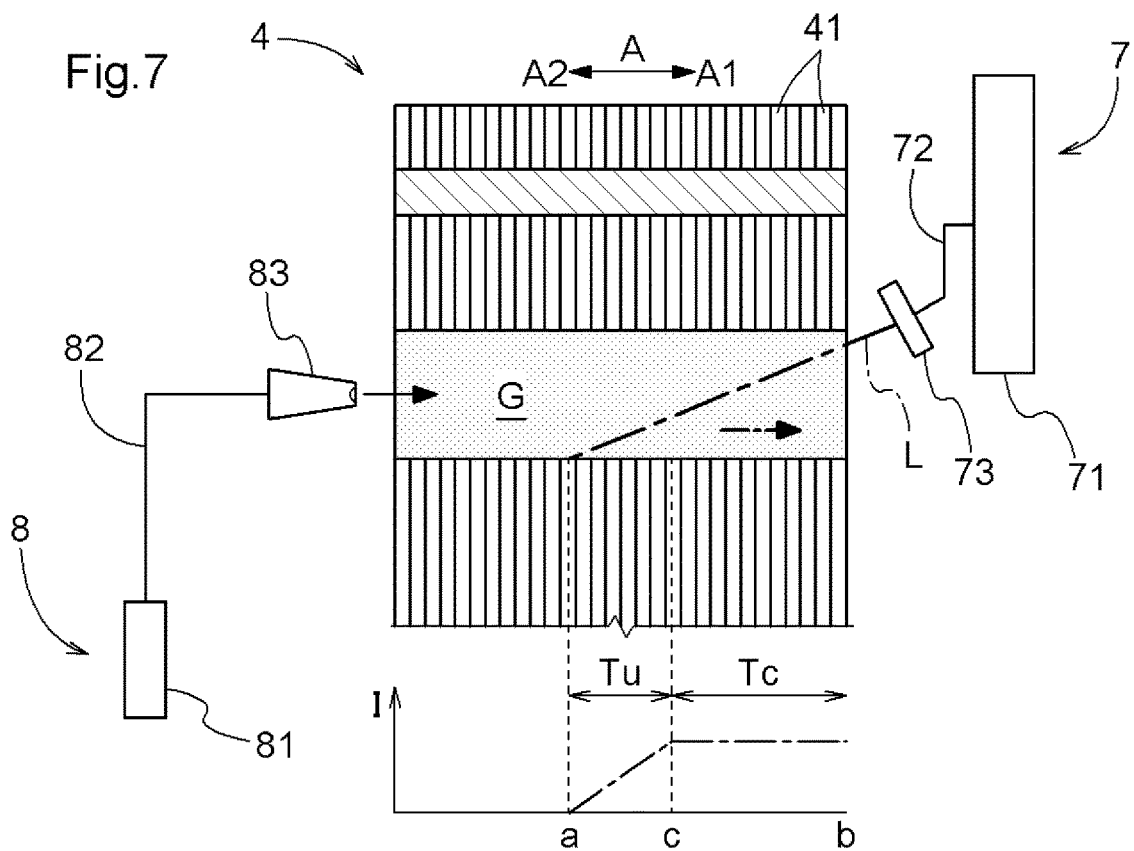
FIG. 7 is a schematic view illustrating a first welding step of a second embodiment.
Figure 8:
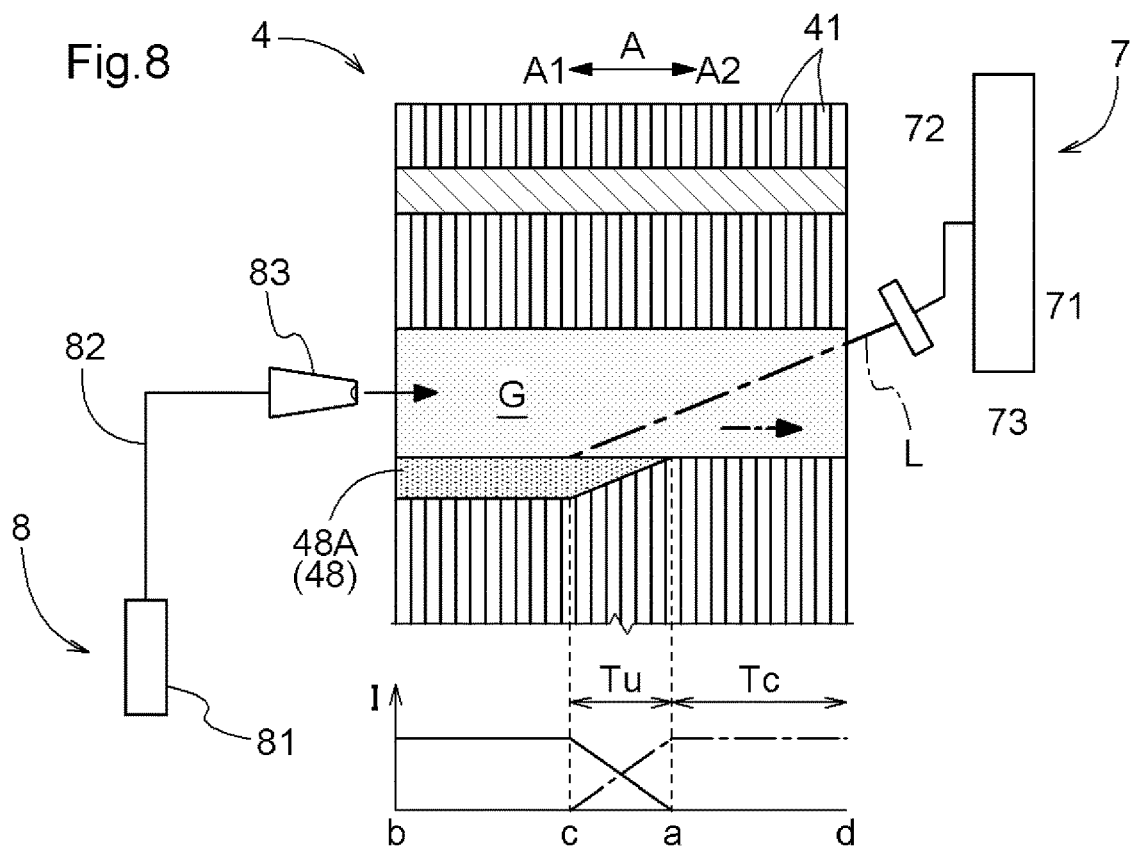
FIG. 8 is a schematic view illustrating a second welding step of the second embodiment.

In the present embodiment, as shown in FIGS. 7 and 8, only one welding device 7 is used, and the first welding step and the second welding step are performed by using a gas supply device 8 in addition to the welding device 7. The gas supply device 8 is configured as a shielding gas supply device having a mechanism for supplying a shielding gas. The gas supply device 8 includes a gas supply source 81, a pipe 82 connected to the gas supply source 81, and a gas nozzle 83 connected to the tip end of the pipe 82. The gas supply source 81 is, e.g., a gas cylinder and supplies an inert gas G such as nitrogen gas, argon gas, or helium gas. The inert gas G from the gas supply source 81 is passed through the pipe 82 and is injected through the gas nozzle 83. The gas nozzle 83 is disposed so as to face a workpiece, namely the stack 4 (specifically, the magnetic barrier hole 39) of the electromagnetic steel plates 41.

The welding device 7 and the gas supply device 8 are disposed on both sides of the stack 4 of the electromagnetic steel plates 41 in the axial direction A. In the first welding step and the second welding step, with the through hole (the magnetic barrier hole 39) filled with the inert gas G supplied from the gas supply device 8, the inner surface 39a of the through hole (the magnetic barrier hole 39) is laser-welded in the axial direction A. In the first welding step, first welding is performed on the stack 4 of the electromagnetic steel plates 41 toward the first side A1 in the axial direction in the presence of the inert gas G. After the first welding step, the stack 4 of the electromagnetic steel plates 41 is inverted in the axial direction A. Thereafter, in the second welding step, second welding is performed on the stack 4 of the electromagnetic steel plates 41 toward the second side A2 in the axial direction in the presence of the inert gas G.

Even in the case where the first welding step and the second welding step are thus sequentially performed by using the single welding device 7, productivity can be improved as the first welding region R1 for the first welding step and the second welding region R2 for the second welding step are separately provided on both sides in the axial direction A. Moreover, as the first increase region R1u for the first welding step and the second increase region R2u for the second welding step are made to overlap each other in the axial direction A at the same position in the circumferential direction, a sufficient fixing force can be obtained while stabilizing welding quality.

In the present embodiment, laser welding is performed with the through hole (the magnetic barrier hole 39) filled with the inert gas G, formation of spatter and blow holes can further be restrained and welding quality can further be stabilized. Since the through hole (the magnetic barrier hole 39) is relatively narrow, variation in concentration of the inert gas G depending on the position can be reduced. Formation of spatter and blow holes can therefore be more effectively restrained.

Third Embodiment

A third embodiment of the core and the core manufacturing method will be described with reference to the drawings. The present embodiment is partially different from the first embodiment in the specific manner in which the first welding step and the second welding step are performed. Accordingly, the specific configuration of the core that is produced is also partially different from the first embodiment. The core and the core manufacturing method of the present embodiment will be described below mainly with respect to the differences from the first embodiment. The present embodiment is similar to the first embodiment unless otherwise specified, and the elements similar to the first embodiment are denoted with the same reference characters and detailed description thereof will be omitted.

Figure 9:
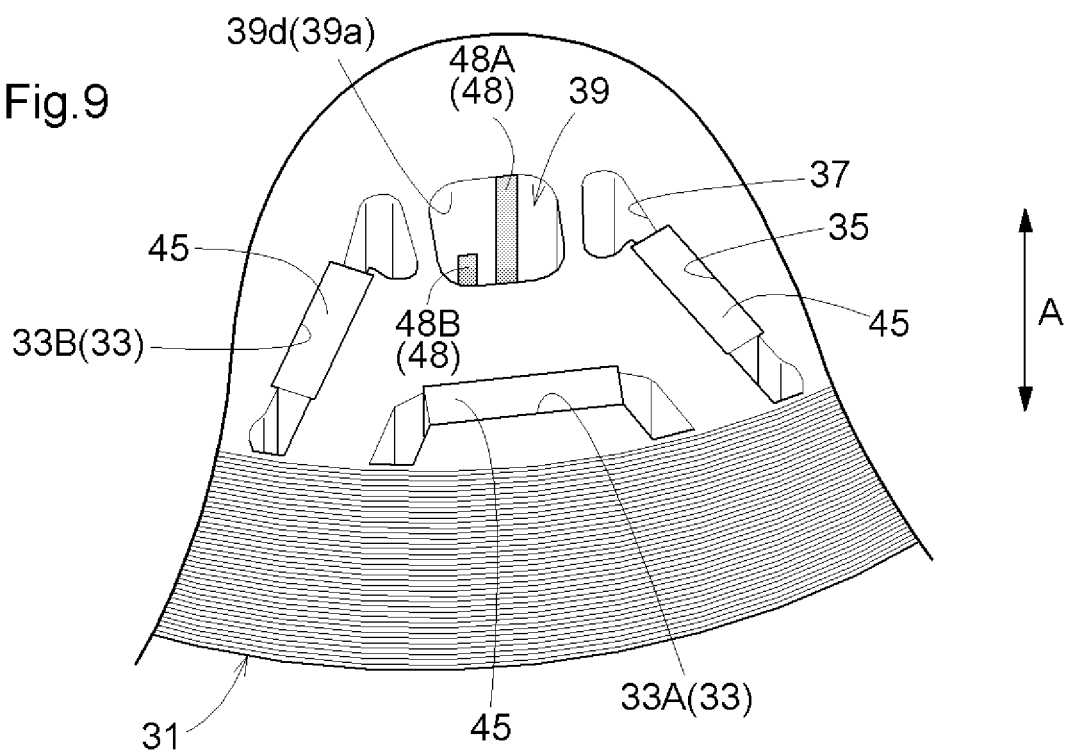
FIG. 9 is an enlarged perspective view of a rotor of a third embodiment.
Figure 10:
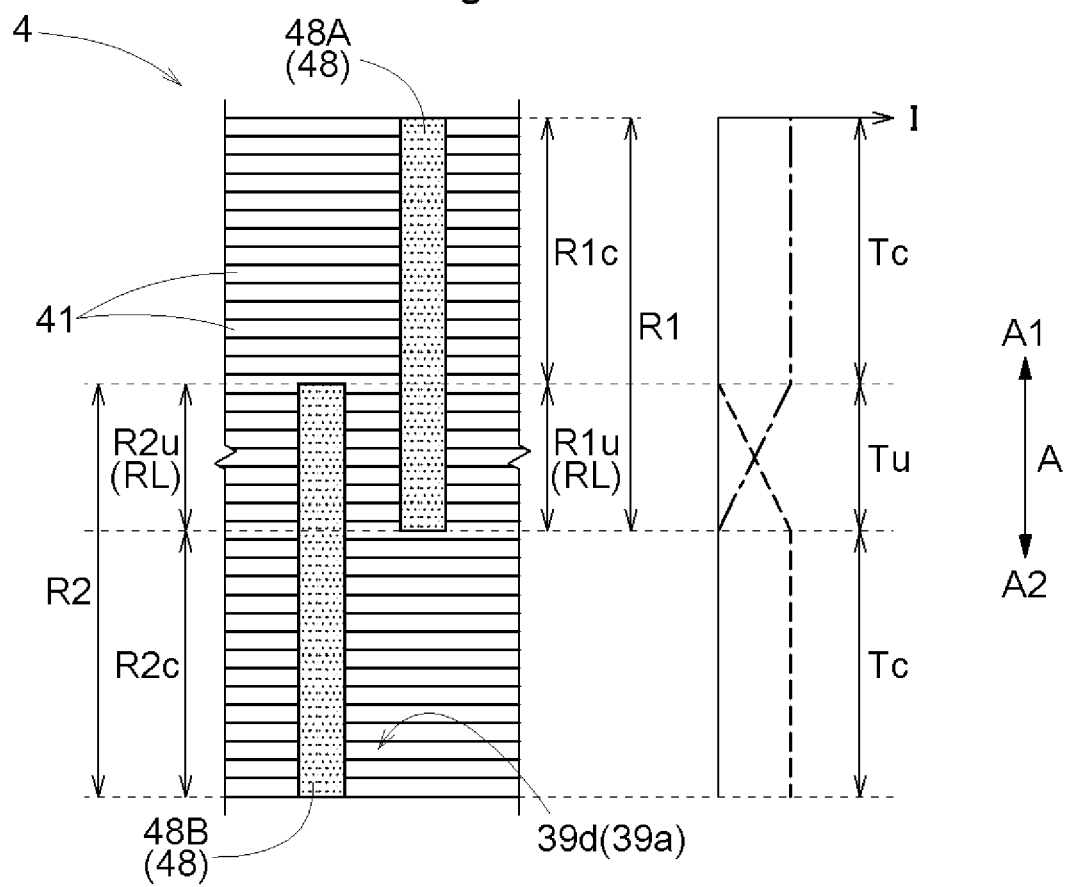
FIG. 10 is a view showing an inner surface of a magnetic barrier hole as viewed from the inside of the magnetic barrier hole.

In the present embodiment, the first welding region R1, namely a region in the axial direction A which is welded in the first welding step, and the second welding region R2, namely a region in the axial direction A which is welded in the second welding step, overlap each other in the axial direction A at different positions in the circumferential direction in the through hole (the magnetic barrier hole 39). As shown in FIGS. 9 and 10, the first melted portion 48A extending through a plurality of the electromagnetic steel plates 41 from the end on the first side A1 in the axial direction and the second melted portion 48B extending through a plurality of the electromagnetic steel plates 41 from the end on the second side A2 in the axial direction overlap each other in the axial direction A at different positions in the circumferential direction in the through hole (the magnetic barrier hole 39). The first melted portion 48A and the second melted portion 48B are not fused, but instead are formed independently of each other.

In this case, as shown in FIG. 10, the melting depth of the overlapping region RL in the axial direction A (the first increase region R1u) of the first melted portion 48A with the second melted portion 48B is shallower than that of the remaining region (the first constant output region R1c) of the first melted portion 48A. The melting depth of the overlapping region RL in the axial direction A (the second increase region R2u) of the second melted portion 48B with the first melted portion 48A is also shallower than that of the remaining region (the second constant output region R2c) of the second melted portion 48B. In the present embodiment, the first melted portion 48A and the second melted portion 48B are formed independently at different positions in the circumferential direction, and the sum of the sectional area of the first melted portion 48A and the sectional area of the second melted portion 48B is constant along the entire length in the axial direction A.

In the present embodiment as well, productivity can be improved as the first welding region R1 for the first welding step and the second welding region R2 for the second welding step are separately provided on both sides in the axial direction A. Moreover, as the first increase region R1u for the first welding step and the second increase region R2u for the second welding step are made to overlap each other in the axial direction A at different positions in the circumferential direction, a sufficient fixing force can be obtained while stabilizing welding quality.

Figure 11:
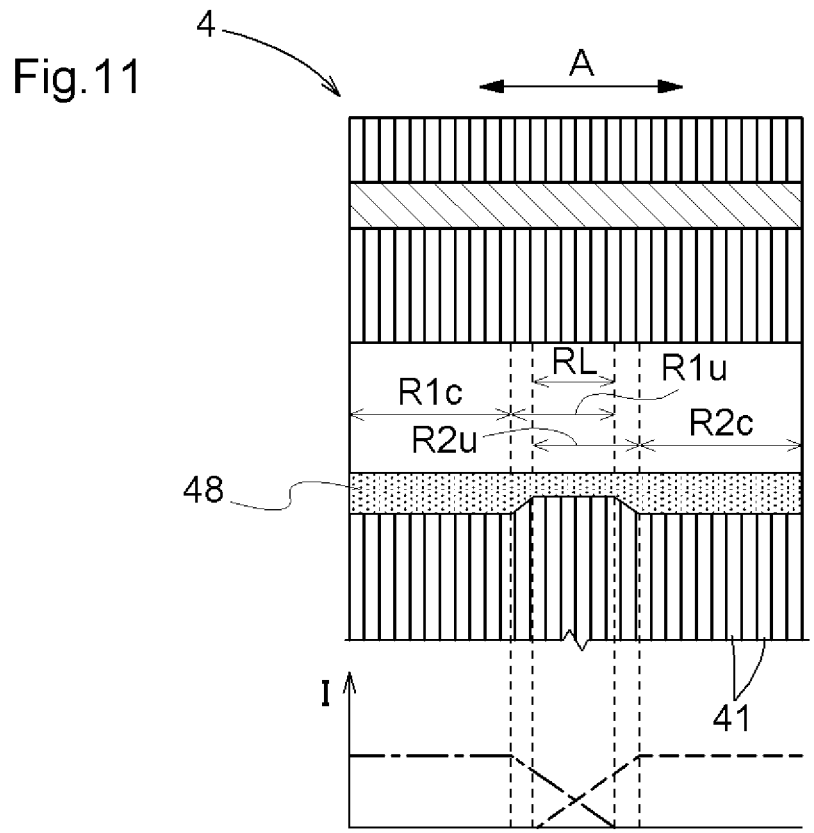
FIG. 11 is a schematic view illustrating another form of the first welding step and the second welding step.
Figure 12:
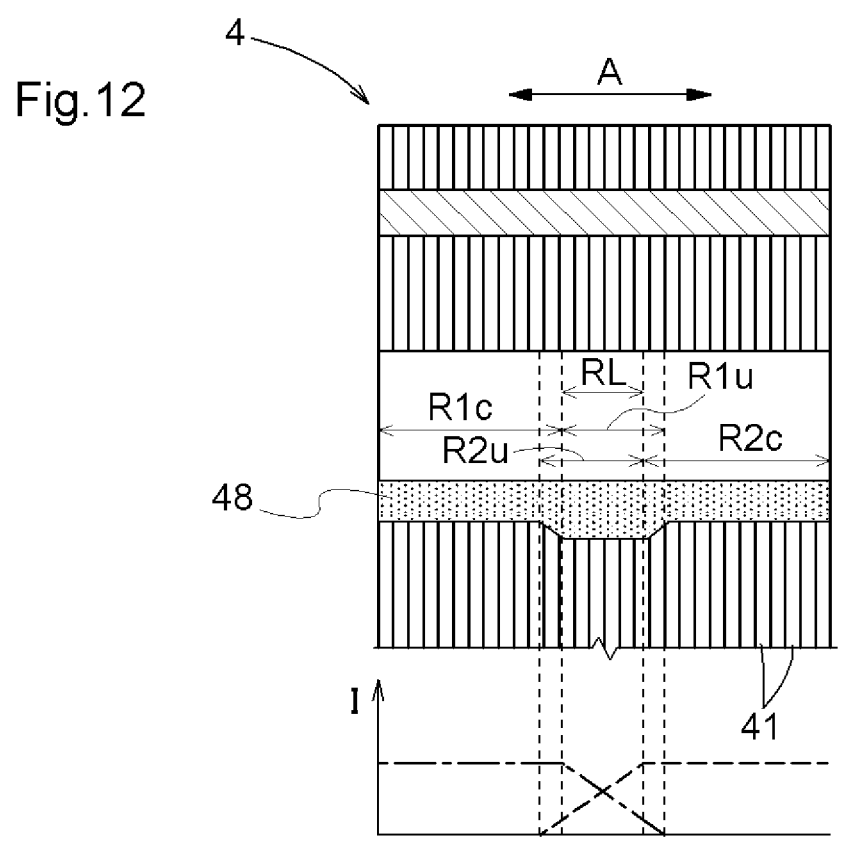
FIG. 12 is a schematic view illustrating still another form of the first welding step and the second welding step.

Other Embodiments (1) Each of the above embodiments is described with respect to the configuration in which the first increase region R1u and the second increase region R2u completely overlap each other in the axial direction A. However, the present disclosure is not limited to such a configuration. For example, as shown in FIGS. 11 and 12, the first increase region R1u and the second increase region R2u may not completely overlap each other in the axial direction A, but instead may be shifted from each other in the axial direction A.

(2) Each of the above embodiments is described with respect to the configuration in which the first constant output region R1c and the second increase region R2u do not overlap each other and the second constant output region R2c and the first increase region R1u do not overlap each other. However, the present disclosure is not limited to such a configuration. The first constant output region R1c and the second increase region R2u may overlap each other and/or the second constant output region R2c and the first increase region R1u may overlap each other (FIG. 12 shows an example in which the first constant output region R1c and the second increase region R2u overlap each other and the second constant output region R2c and the first increase region R1u overlap each other).

(3) Each of the above embodiments is described with respect to the configuration in which the output energy of the welding device 7 is kept at a fixed value during the constant output period Tc of the first welding step and the second welding step. However, the present disclosure is not limited to such a configuration. The output energy of the welding device 7 may vary slightly as long as at least the output energy of the welding device 7 is kept within a certain range such as ±5%.

Figure 13:
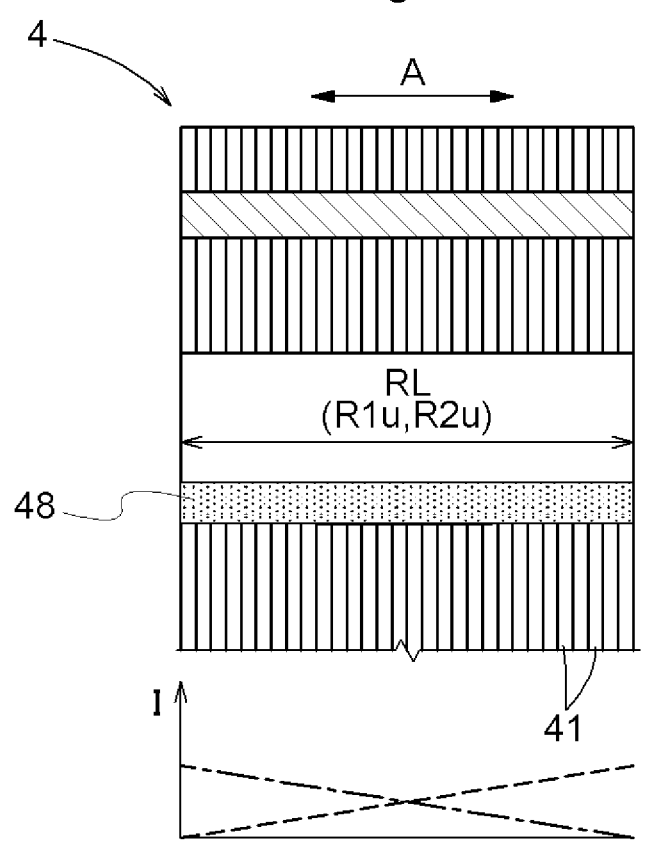
FIG. 13 is a schematic view illustrating yet another form of the first welding step and the second welding step.

(4) Each of the above embodiments is described with respect to the configuration in which each of the first welding step and the second welding step includes the output increase period Tu and the constant output period Tc. However, the present disclosure is not limited to such a configuration. At least one of the first welding step and the second welding step may not include the constant output period Tc, but instead may include only the output increase period Tu (FIG. 13 shows an example in which both the first and second welding steps do not include the constant output period Tc). Alternatively, at least one of the first welding step and the second welding step may not include the output increase period Tu, but instead may include only the constant output period Tc.

(5) Each of the above embodiments is described with respect to the configuration in which the overlapping region RL of the first increase region R1u and the second increase region R2u is set so as to include the middle position of the stack 4 in the axial direction A. However, the present disclosure is not limited to such a configuration. The overlapping region RL may be set so as to be located in an end region in the axial direction A of the stack 4.

(6) Each of the above embodiments is described with respect to the configuration in which the inner surface 39a of the magnetic barrier hole 39 is laser-welded in the first welding step and the second welding step. However, the present disclosure is not limited to such a configuration. For example, the inner surface of the magnet insertion hole 33 (specifically, the magnetic barrier portion 37) may be laser-welded. Alternatively, an inner peripheral surface (the inner surface of the central hole 32) or the outer peripheral surface of the rotor core 31 may be laser-welded. In these configurations, the magnet insertion hole 33 and the central hole 32 corresponds to the "through hole." In this case, different portions (portions located at different positions in the circumferential direction as in the third embodiment) may be laser-welded in the first welding step and the second welding step as long as the first increase region R1u and the second increase region R2u overlap each other in the axial direction A.

(7) Each of the above embodiments is described with respect to the configuration in which laser welding is performed in the first welding step and the second welding step. However, the present disclosure is not limited to such a configuration. For example, the first welding step and the second welding step may be performed by other welding methods such as electron beam welding.

(8) Each of the above embodiments is described with respect to the configuration in which the core manufacturing method is applied to manufacturing of the rotor core 31. However, the present disclosure is not limited to such a configuration. For example, in the case where the stator core 21 is formed by a plurality of electromagnetic steel plates, the above core manufacturing method may be applied to manufacturing of the stator core 21. In this case, the stator core 21 corresponds to the "core."

(9) The configuration disclosed in each of the embodiments described above (including the above embodiments and other embodiments described above; the same applies to the following description) may be combined with the configurations disclosed in the other embodiments unless inconsistency arises. Regarding other configurations as well, the embodiments disclosed herein are merely illustrative in all respects and may be modified as appropriate without departing from the spirit and scope of the present disclosure.

Summary of Embodiments

According to the above description, the core manufacturing method of the present disclosure suitably includes the following configurations.

A core manufacturing method for manufacturing a core (21, 31) for a rotating electrical machine (1) having a stator (2) and a rotor (3) by using a welding device (7) includes: a stacking step of stacking a plurality of electromagnetic steel plates (41) in an axial direction (A); a first welding step of performing first welding on an inner surface of a through hole (32, 33, 39) formed in a stack (4) of the electromagnetic steel plates (41) and continuous in the axial direction (A), the first welding being performed toward a first side (A1) in the axial direction which is one side in the axial direction (A); and a second welding step of performing second welding on the inner surface of the through hole (32, 33, 39), the second welding being performed toward a second side (A2) in the axial direction which is the other side in the axial direction (A). A first welding region (R1) and a second welding region (R2) overlap each other in the axial direction (A), the first welding region (R1) being a region in the axial direction (A) which is welded in the first welding step, and the second welding region (R2) being a region in the axial direction (A) which is welded in the second welding step.

With this configuration, since the inner surface of the through hole (32, 33, 39) of the stack of the electromagnetic steel plates (41) is welded from both sides in the axial direction (A), productivity can be improved. In this case, since the first welding region (R1) that is welded in the first welding step and the second welding region (R2) that is welded in the second welding region overlap each other in the axial direction (A), a sufficient fixing force can be obtained.

In one aspect, it is preferable that the first welding region (R1) and the second welding region (R2) be located at different positions in a circumferential direction.

Alternatively, in one aspect, it is preferable that the first welding region (R1) and the second welding region (R2) be located at the same position in a circumferential direction.

With these configurations, a sufficient fixing force can be obtained.

In one aspect, it is preferable that each of the first welding step and the second welding step includes an output increase period (Tu) during which welding is performed while gradually increasing output energy of the welding device (7), and a first increase region (R1$u$) and a second increase region (R2$u$) overlap each other in the axial direction (A), the first increase region (R1$u$) being a part of the first welding region (R1) which is welded during the output increase period (Tu) of the first welding step, and the second increase region (R2$u$) being a part of the second welding region (R2) which is welded during the output increase period (Tu) of the second welding step.

With this configuration, in each of the first welding step and the second welding step, the output energy of the welding device (7) is gradually increased during the output increase period (Tu). Formation of spatter and blow holes can therefore be restrained. Accordingly, welding quality can be stabilized.

In each of the first increase region (R1$u$) for the first welding step and the second increase region (R2$u$) for the second welding step, the output energy of the welding device (7) is relatively low and the sectional area of a melted portion resulting from welding is therefore relatively small. Even in such a case, since the first increase region (R1$u$) and the second increase region (R2$u$) overlap each other in the axial direction (A), the sectional areas of the melted portions in these increase regions (R1$u$, R2$u$) can compensate each other and a sufficient overall fixing force can be obtained.

Accordingly, a sufficient fixing force can be obtained while stabilizing welding quality.

A core manufacturing method for manufacturing a core (21, 31) for a rotating electrical machine (1) having a stator (2) and a rotor (3) by using a welding device (7) includes: a stacking step of stacking a plurality of electromagnetic steel plates (41) in an axial direction (A); a first welding step of performing first welding on a stack (4) of the electromagnetic steel plates (41), the first welding being performed toward a first side (A1) in the axial direction which is one side in the axial direction (A); and a second welding step of performing second welding on the stack (4), the second welding being performed toward a second side (A2) in the axial direction which is the other side in the axial direction (A). Each of the first welding step and the second welding step includes an output increase period (Tu) during which welding is performed while gradually increasing output energy of the welding device (7), and a first increase region (R1$u$) and a second increase region (R2$u$) overlap each other in the axial direction (A), the first increase region being a region in the axial direction (A) which is welded during the output increase period (Tu) of the first welding step, the second increase region being a region in the axial direction (A) which is welded during the output increase period (Tu) of the second welding step.

With this configuration, in each of the two steps in which welding is performed by scanning in the opposite directions in the axial direction (A) (the first welding step and the second welding step), the output energy of the welding device (7) is gradually increased during the output increase period (Tu). Formation of spatter and blow holes can therefore be restrained. Accordingly, welding quality can be stabilized.

In each of the first increase region (R1$u$) for the first welding step and the second increase region (R2$u$) for the second welding step, the output energy of the welding device (7) is relatively low and the sectional area of a melted portion resulting from welding is therefore relatively small. Even in such a case, since the first increase region (R1$u$) and the second increase region (R2$u$) overlap each other in the axial direction (A), the sectional areas of the melted portions in these increase regions (R1$u$, R2$u$) can compensate each other and a sufficient overall fixing force can be obtained.

Accordingly, when manufacturing the core (21, 31) for the rotating electrical machine (1) by stacking the plurality of electromagnetic steel plates (41) and joining the stacked electromagnetic steel plates (41) together by welding, a sufficient fixing force can be obtained while stabilizing welding quality.

In one aspect, it is preferable that an amount by which the first increase region (R1$u$) and the second increase region (R2$u$) overlap each other in the axial direction (A) be set so that a sectional area of a radial section of a melted portion (48) that is formed in an overlapping region (RL) of the first increase region (R1$u$) and the second increase region (R2$u$) is equal to or larger than a predetermined reference area.

With this configuration, a sufficient fixing force can be obtained by the melted portion (48) having a sectional area equal to or larger than the predetermined reference area in the overlapping region (RL).

In one aspect, it is preferable that the first increase region (R1$u$) and the second increase region (R2$u$) be set so as to be located at the same position in the axial direction (A) and to have the same length in the axial direction (A).

With this configuration, the sectional area of the radial section of the melted portion (48) can be easily made constant along its entire length in the axial direction (A). Accordingly, even in the case where the plurality of electromagnetic steel plates (41) are stacked and joined together by welding, magnetic characteristics of the core (21, 31) that is produced can be easily made uniform in the axial direction (A).

In one aspect, it is preferable that each of the first welding step and the second welding step includes a constant output period (Tc) during which welding is performed while keeping output energy of the welding device (7) within a certain range, and a first constant output region (R1c) does not overlap the second increase region (R2u) and a second constant output region (R2c) does not overlap the first increase region (R1u), the first constant output region (R1c) being a region in the axial direction (A) which is welded during the constant output period (Tc) of the first welding step, and the second constant output region (R2c) being a region in the axial direction (A) which is welded during the constant output period (Tc) of the second welding step.

With this configuration, the sectional area of the radial section of the melted portion (48) can be easily made constant along its entire length in the axial direction (A). Accordingly, even in the case where the plurality of electromagnetic steel plates (41) are stacked and joined together by welding, magnetic characteristics of the core (21, 31) that is produced can be easily made uniform in the axial direction (A).

In one aspect, it is preferable that the welding device (7) include a first welding device (7A) that is disposed on the first side (A1) in the axial direction with respect to the stack (4) and a second welding device (7B) that is disposed on the second side (A2) in the axial direction with respect to the stack (4), and a position of an overlapping region (RL) be set so as to include a middle position of the stack (4) in the axial direction (A), the overlapping region (RL) being a region where the first increase region (R1u) and the second increase region (R2u) overlap each other in the axial direction (A).

With this configuration, the first welding step and the second welding step can be respectively performed by the first welding device (7A) and the second welding device (7B) which are disposed on both sides of the stack (4) in the axial direction (A). Since the overlapping region (RL) is set as a region including the middle position of the stack (4) in the axial direction (A), the scanning ranges of the first welding device (7A) and the second welding device (7B) can be made substantially equal to each other, whereby uniform welding can be performed in the axial direction (A).

In one aspect, it is preferable that an operation period of the first welding device (7A) and an operation period of the second welding device (7B) be made to overlap each other so that duration of the first welding step and duration of the second welding step overlap each other.

With this configuration, the core (21, 31) for the rotating electrical machine (1) can be efficiently manufactured in a short time.

A core according to the present disclosure suitably includes the following configurations.

A core (21, 31) for a rotating electrical machine (1) is comprised of a stack formed by stacking a plurality of electromagnetic steel plates (41) in an axial direction (41), the stack has a through hole (32, 33, 39) that is continuous in the axial direction (A), a first melted portion (48A) and a second melted portion (48B) are formed in an inner surface of the through hole (32, 33, 39), the first melted portion (48A) extending through a plurality of the electromagnetic steel plates (41) from an end on a first side (A1) in the axial direction which is one side in the axial direction (A), and the second melted portion (48B) extending through a plurality of the electromagnetic steel plates (41) from an end on a second side (A2) in the axial direction which is the other side in the axial direction (A), and the first melted portion (48A) and the second melted portion (48B) are located at different positions in a circumferential direction and overlap each other in the axial direction (A).

With this configuration, the first welding portion (48A) and the second welding portion (48B) are formed in the inner surface of the through hole of the stack (32, 33, 39) of the electromagnetic steel plates (41) so as to extend from both sides in the axial direction (A). The core (21, 31) can therefore be produced with high productivity. Since the first welding portion (48A) and the second welding portion (48B) are located at different positions in the circumferential direction and overlap each other in the axial direction (A), a sufficient fixing force can be obtained.

In one aspect, it is preferable that a melting depth of an overlapping region (RL) of the first melted portion (48A) with the second melted portion (48B) in the axial direction (A) be shallower than that of the remaining region of the first melted portion (48A), and a melting depth of an overlapping region (RL) of the second melted portion (48B) with the first melted portion (48A) in the axial direction (A) be shallower than that of the remaining region of the second melted portion (48B).

With this configuration, a variation in fixing force can be easily reduced along the entire length in the axial direction (A).

The core manufacturing method according to the present disclosure need only have at least one of the effects described above.

The invention claimed is:

1. A core manufacturing method for manufacturing a core for a rotating electrical machine having a stator and a rotor by using a welding device, the core manufacturing method comprising:
    stacking a plurality of electromagnetic steel plates in an axial direction;
    performing first welding on an inner surface of a through hole formed in a stack of the electromagnetic steel plates and continuous in the axial direction, the first welding being performed toward a first side in the axial direction which is one side in the axial direction; and
    performing second welding on the inner surface of the through hole, the second welding being performed toward a second side in the axial direction which is the other side in the axial direction, wherein
    a first welding region and a second welding region overlap each other in the axial direction, the first welding region being a region in the axial direction which is welded in the first welding, and the second welding region being a region in the axial direction which is welded in the second welding.

2. The core manufacturing method according to claim 1, wherein
    the first welding region and the second welding region are located at different positions in a circumferential direction.

3. The core manufacturing method according to claim 1, wherein
    the first welding region and the second welding region are located at a same position in a circumferential direction.

4. The core manufacturing method according to claim 1, wherein
    each of the first welding and the second welding includes an output increase period during which welding is performed while gradually increasing output energy of the welding device, and
    a first increase region and a second increase region overlap each other in the axial direction, the first increase region being a part of the first welding region which is welded during the output increase period of the first welding, and the second increase region being a part of the second welding region which is welded during the output increase period of the second welding.

5. The core manufacturing method according to claim 4, wherein
the first increase region and the second increase region are set so as to be located at a same position in the axial direction and to have a same length in the axial direction.

6. The core manufacturing method according to claim 5, wherein
each of the first welding and the second welding includes a constant output period during which welding is performed while keeping output energy of the welding device within a certain range, and
a first constant output region does not overlap the second increase region and a second constant output region does not overlap the first increase region, the first constant output region being a region in the axial direction which is welded during the constant output period of the first welding, and the second constant output region being a region in the axial direction which is welded during the constant output period of the second welding.

7. The core manufacturing method according to claim 4, wherein
each of the first welding and the second welding includes a constant output period during which welding is performed while keeping output energy of the welding device within a certain range, and
a first constant output region does not overlap the second increase region and a second constant output region does not overlap the first increase region, the first constant output region being a region in the axial direction which is welded during the constant output period of the first welding, and the second constant output region being a region in the axial direction which is welded during the constant output period of the second welding.

8. The core manufacturing method according to claim 4, wherein
the welding device includes a first welding device that is disposed on the first side in the axial direction with respect to the stack and a second welding device that is disposed on the second side in the axial direction with respect to the stack, and
a position of an overlapping region is set so as to include a middle position of the stack in the axial direction, the overlapping region being a region where the first increase region and the second increase region overlap each other in the axial direction.

9. The core manufacturing method according to claim 8, wherein
an operation period of the first welding device and an operation period of the second welding device are made to overlap each other so that duration of the first welding and duration of the second welding overlap each other.

10. A core manufacturing method for manufacturing a core for a rotating electrical machine having a stator and a rotor by using a welding device, the core manufacturing method comprising:
stacking a plurality of electromagnetic steel plates in an axial direction;
performing first welding on a stack of the electromagnetic steel plates, the first welding being performed toward a first side in the axial direction which is one side in the axial direction; and
performing second welding on the stack, the second welding being performed toward a second side in the axial direction which is the other side in the axial direction, wherein
each of the first welding and the second welding includes an output increase period during which welding is performed while gradually increasing output energy of the welding device, and
a first increase region and a second increase region overlap each other in the axial direction, the first increase region being a region in the axial direction which is welded during the output increase period of the first welding, the second increase region being a region in the axial direction which is welded during the output increase period of the second welding.

11. The core manufacturing method according to claim 10, wherein
an amount by which the first increase region and the second increase region overlap each other in the axial direction is set so that a sectional area of a radial section of a melted portion that is formed in an overlapping region of the first increase region and the second increase region is equal to or larger than a predetermined reference area.

12. The core manufacturing method according to claim 10, wherein
the first increase region and the second increase region are set so as to be located at a same position in the axial direction and to have a same length in the axial direction.

13. The core manufacturing method according to claim 10, wherein
each of the first welding and the second welding includes a constant output period during which welding is performed while keeping output energy of the welding device within a certain range, and
a first constant output region does not overlap the second increase region and a second constant output region does not overlap the first increase region, the first constant output region being a region in the axial direction which is welded during the constant output period of the first welding, and the second constant output region being a region in the axial direction which is welded during the constant output period of the second welding.

14. The core manufacturing method according to claim 10, wherein
the welding device includes a first welding device that is disposed on the first side in the axial direction with respect to the stack and a second welding device that is disposed on the second side in the axial direction with respect to the stack, and
a position of an overlapping region is set so as to include a middle position of the stack in the axial direction, the overlapping region being a region where the first increase region and the second increase region overlap each other in the axial direction.

15. The core manufacturing method according to claim 14, wherein
an operation period of the first welding device and an operation period of the second welding device are made to overlap each other so that duration of the first welding and duration of the second welding overlap each other.

16. A core for a rotating electrical machine, the core comprising:
a stack formed by stacking a plurality of electromagnetic steel plates in an axial direction, wherein:
the stack has a through hole that is continuous in the axial direction,
a first melted portion and a second melted portion are formed in an inner surface of the through hole, the first melted portion extending through a plurality of the electromagnetic steel plates in the axial direction from an end on a first side in the axial direction which is one side in the axial direction, and the second melted portion extending through a plurality of the electromagnetic steel plates in the axial direction from an end on a second side in the axial direction which is the other side in the axial direction, and
the first melted portion and the second melted portion are located at different positions in a circumferential direction and overlap each other in the axial direction.

17. The core according to claim 16, wherein
a melting depth of an overlapping region of the first melted portion with the second melted portion in the axial direction is shallower than that of a remaining region of the first melted portion, and
a melting depth of an overlapping region of the second melted portion with the first melted portion in the axial direction is shallower than that of a remaining region of the second melted portion.

* * * * *